W. A. COURTLAND.
SPOOL HOLDER.
APPLICATION FILED MAY 24, 1911.
1,020,401.
Patented Mar. 19, 1912.
2 SHEETS—SHEET 2.
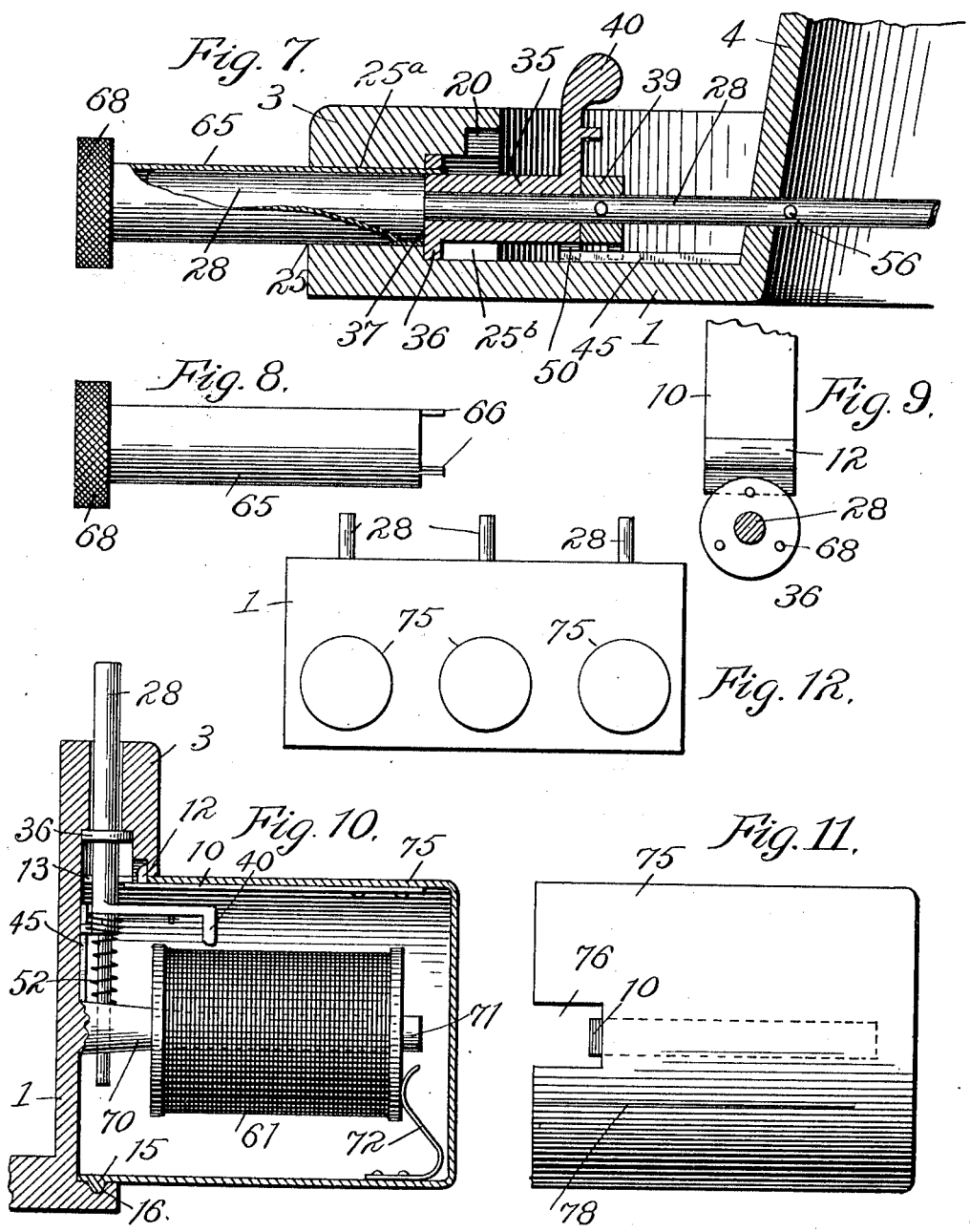
Witnesses:
J H Marvin
Frank W. Pilcox
Inventor
William A. Courtland

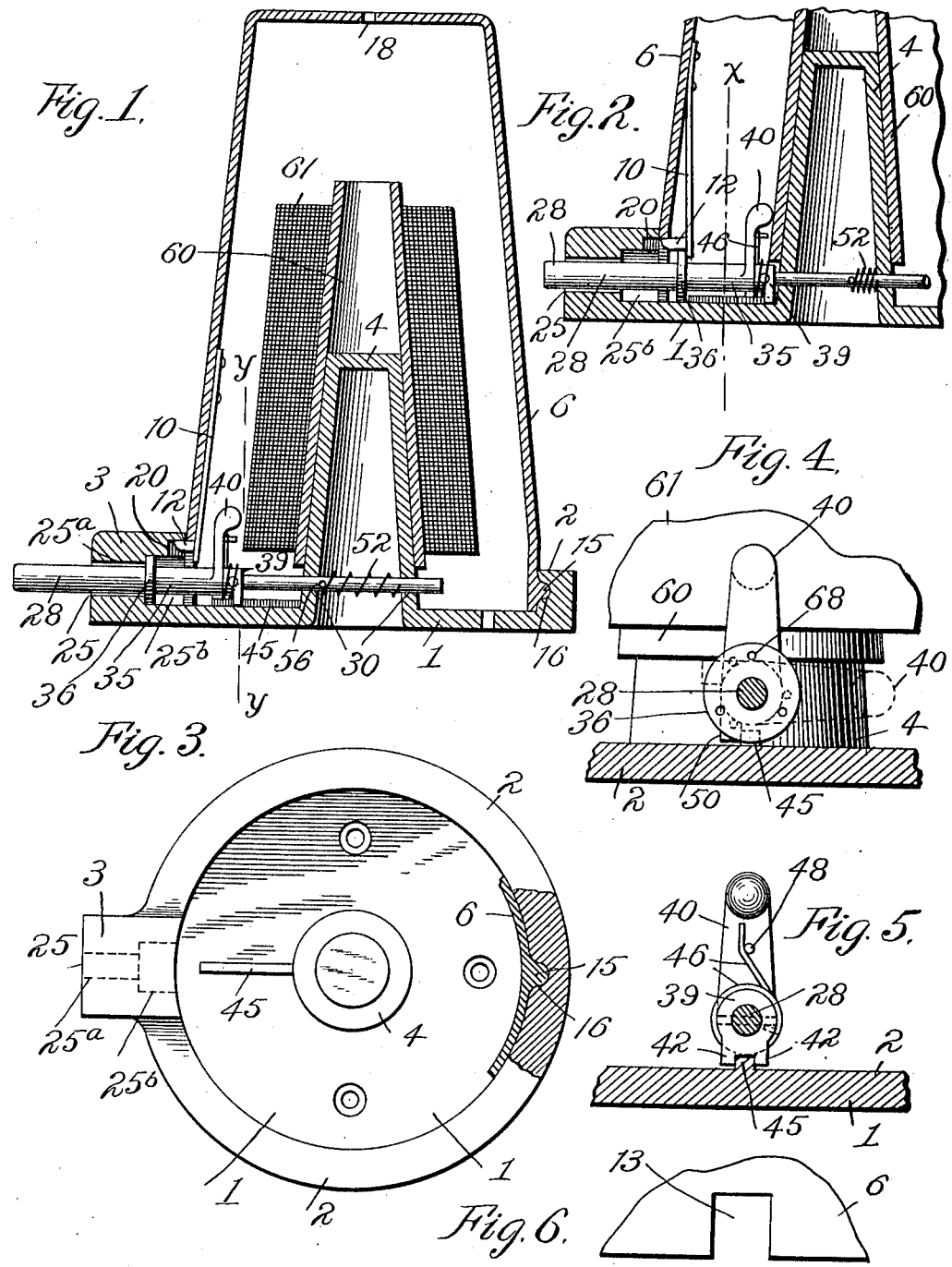

UNITED STATES PATENT OFFICE.

WILLIAM A. COURTLAND, OF NEW YORK, N. Y.

SPOOL-HOLDER.

1,020,401.

Specification of Letters Patent.   Patented Mar. 19, 1912.

Application filed May 24, 1911.   Serial No. 629,141.

*To all whom it may concern:*

Be it known that I, WILLIAM A. COURTLAND, a citizen of the United States, residing in the borough of Brooklyn, city, county, and State of New York, have invented certain new and useful Improvements in Spool-Holders, of which the following is a specification.

My invention relates in general to improvements in spool or bobbin holders, and more particularly to a device for protecting and safeguarding silk or other valuable threads contained on spools or bobbins.

The object of my invention is to construct a spool or bobbin holding device of the kind wherein an operator is prevented from surreptitiously removing a spool or bobbin from the holder, or from removing any part of said thread from the spool or bobbin, except in the manner intended.

Another object of my invention is to make a master key capable of controlling the latching mechanism to open the holder, when it is desired to replace an unfinished spool or bobbin or regain the end of a lost thread.

To accomplish these and other objects I have made a safety spool and bobbin holding device of the kind wherein a spool or bobbin is placed upon a holder and a cover automatically latched to the said holder and means provided within said holder capable of opening said holder when the thread has been completely unwound from the spool or bobbin.

With these ends in view I have devised a spool or bobbin holder, hereinafter described in detail and the features of novelty pointed out in the claims.

In the accompanying drawings: Figure 1 is a vertical section of the holder with the cover latched thereto and a filled bobbin in position to prevent the unlatching of said cover. Fig. 2 is a detail sectional view similar to Fig. 1, but showing only a portion of the holder and with the thread removed from the bobbin, the plunger rod thrust inward and the latch released to allow the cover to be removed from the base of the holder. Fig. 3 is a plan view of the base showing only the rear portion of the cover in attached position. Fig. 4 is an enlarged detail sectional view on the line X—X looking to the right in Fig. 2. Fig. 5 is an enlarged detail sectional view on the line Y—Y looking to the right in Fig. 1. Fig. 6 is a detail view of a portion of the cover showing how it is cut away to receive the latch. Fig. 7 is an enlarged detail sectional view showing in operative position, the key for operating the parts to release the latch when a filled spool or bobbin is in position. Fig. 8 is a side view of the key. Fig. 9 is a detail view in elevation, showing how the annular head on the sleeve is operated by the plunger rod to engage the latch to release it from the base of the holder. Fig. 10 shows a modified form of the invention wherein an ordinary spool is used instead of a conical bobbin. Fig. 11 is a plan view of the spool cover removed. Fig. 12 is a view showing how a plurality of spools may be mounted on a common base or holder and be independently operatable.

In the practical application and construction of my invention, 1 is the holder or base on which is formed an upturned flange 2 with an enlarged portion or boss 3, on one side of said flange. Extending upwardly from and preferably integral with the base of the holder is a hollow, conical spool or bobbin holder 4. 6 is the cover the bottom of which is arranged to fit within the flange 2 of the holder 1. The cover can be of any suitable formation but I preferably make it conical as shown in Fig. 1. When it is made as herein shown the bottom thereof is constructed with parallel sides so that it will fit snugly within the flange 2 of holder 1. Fastened to the inner wall of the cover 6, in a manner to permit the lower end thereof to be acted upon, is a spring latch 10. On the lower end of this spring latch and extending outwardly from the center of the holder, is a keeper or latch head 12. This spring latch normally rests against the inner wall of the cover in such a manner that the keeper 12 will project through an opening 13 cut in the bottom of the cover, as shown in Figs. 1, 2 and 6.

Formed on the outside of the cover near the bottom edge and diametrically opposite the spring latch, is a boss or knob 15 adapted to fit within a depression 16 formed in the inner wall of the flange 2. This boss or knob 2 acts as a means to aid the latch 10 in securing or locking the cover to the base. In the top of the cover 6 a small opening 18 is made through which the thread passes from the spool or bobbin to any desired place.

Extending outwardly within the enlarged portion 3 of the flange, is a recess 20. Into this recess projects the keeper or latch head 12, in a manner to engage the upper wall of said recess to hold the cover 6 in the position shown in Fig. 1.

Extending radially through the enlarged portion 3 of the base, on a horizontal plane, is an opening 25. This opening 25 has two diameters, as shown at $25^a$ and $25^b$, the larger diameter being directly under the latch receiving recess 20. Moving within this opening 25, and extending some distance without the base, is a controlling plunger rod 28. This plunger rod is placed in the position shown in Fig. 7, that is the end having the smaller diameter passes through and is guided by holes 30 in the conical bobbin holder 4, while the end of larger diameter passes through the opening 25 and projects beyond the periphery of the base 1.

Mounted on the reduced end of the plunger rod 28, is a sleeve 35. On one end of this sleeve is an annular head 36 which abuts the shoulder 37 on the plunger rod, and is held in position on the plunger rod by a collar 39, said collar being pinned to the plunger rod in a manner to abut the other end of the sleeve 35. It will be noticed that the annular head 36 is the same diameter and rides freely within the opening $25^b$. On the inner end of the sleeve 35 and normally held in an upright position, is a stop finger 40, which when moved inward by the action of the plunger rod engages the thread on the bobbin and prevents the unlatching of the cover from the holder, as will be hereinafter more fully explained.

In order to prevent the plunger rod from turning, I preferably make the collar 39 in the manner particularly shown in Fig. 5, that is, with two downwardly projecting lugs 42 which straddle a rib 45 formed on the upper inner surface of the base of the holder. Coiled around the collar 39 with one end fastened thereto, as shown in Fig. 5, is a spring 46. The free end of this spring 46 extends upwardly and engages a pin 48 on the finger 40, and tends to hold the said finger normally in an upright position.

In order to prevent the spring from throwing the finger 40 too far around, I place on said finger a stop lug 50 which engages one side of the rib 45 on the base 1, as shown in Fig. 4. It should here be noticed that the lower end of the spring latch 10 projects down below the keeper 12 and within the path of the annular head 36, so that when the plunger rod is thrust inward, after the thread has been removed from the bobbin, (see Fig. 3) the annular head will engage the latch 10 and disengage the latch head keeper from the base. The plunger rod 28 is normally held in the position shown in Fig. 1, that is, so that the finger 40 on sleeve 35 does not engage the thread on the bobbin. This is accomplished by mounting on the plunger rod, between the walls of the conical bobbin holder, an expansion spring 52, one end of which engages the wall of the spool holder and the other end a pin 56 on rod 28.

By having the finger 40 normally held in the position shown in Fig. 1, that is between the cover and the thread, a new bobbin or spool can be readily placed in position without adjusting, arranging or changing the operating parts.

The spool or bobbin 60, having wound thereon the thread 61, is placed over the upwardly projecting conical portion 4 of the base 1 in the manner shown in Fig. 1. In the form shown here the spool or bobbin does not revolve but is held firmly on the support 4. It will be noticed that sufficient space is allowed between the thread and the cover to permit the thread to freely unwind.

The device is filled and operated in the following manner: First the bobbin having the thread wound thereon is placed on the bobbin holder 4, the loose end of the thread led out through the opening 18 in the cover, the cover placed in the position shown in Fig. 1, that is so that the boss 15 engages the depression 16 and the keeper 12 on latch 10 engages the wall of recess 20 in the base of the holder. The cover is now locked in position and cannot be removed until the thread has been completely unwound from the bobbin. Any effort to remove the cover, by operating the plunger rod, will result in the finger 20 striking against the thread on the bobbin and preventing the annular head 36 from engaging the lower end of the latch 10. When the thread has been completely unwound from the bobbin the plunger rod can be pushed in, that is until the finger 40 strikes the bobbin, as shown in Fig. 2. It will now be noticed that the annular head has engaged the lower end of the latch 10 and disengaged the keeper from the recess 20, thereby freeing the cover so that it can be turned back and removed from the holder, after which the empty bobbin is removed and a full one substituted and the cover again placed in the position first described. Particular attention is called to the fact that after a filled bobbin has been placed in position and the cover latched to the holder, it is impossible to remove the cover until the thread has been completely removed from the bobbin or spool.

There are times when it is necessary to open the holder to change the thread before the bobbin is emptied, or recover the thread when it breaks. To accomplish this I have made a key for operating the plunger and controlling the finger so that the latch can be released and the cover removed. By referring to Figs. 1, 2 and 3 it will be observed that the opening 25 is just a trifle larger than that portion of the plunger rod which passes through it. The key 65 is preferably made of a thin piece of tubing, the walls of which fit within the space around the plunger rod in opening 25, when the key is thrust into the position shown in Fig. 7. On the inner end of the key is a plurality of prongs 66 which are adapted to engage in corresponding holes 68 in the annular head 36 of sleeve 35. When it is desired to remove the cover, the key is placed over the plunger rod and thrust into the position shown in Fig. 7, that is so that prongs 66 engage in holes 68 in the annular head 36. The knurled head 68 of the key is then turned until the finger 40 is moved to the position shown in dotted lines in Fig. 4. Plunger rod 28 can now be pushed in until the sleeve is in the position shown in Fig. 2, in which position the annular head releases the keeper on the latch from the base, whereupon the cover is removed in the manner hereinbefore described. After the cover has been unlatched, the plunger rod, sleeve and finger are released and will immediately assume the positions shown in Fig. 1, after which the key is removed and the cover again replaced in the manner described. Of course it is understood that the key is never in the possession of the operator, but is kept in the possession of some person in authority and only used when a change of a partially filled bobbin is desired or a broken thread occurs.

In Figs. 10, 11 and 12 a modified form is shown wherein a revolving spool is carried on a spindle held in a horizontal position. This form is particularly intended for spools of silk that are much smaller than the bobbin first shown and described. In this form the parts are the same except the spindle 70 which carries the spool. This spindle tapers at the inner end as shown at 71 and by reason of friction prevents the spool from revolving too fast while the thread is being unwound. 72 is a spring fastened to the cover and tends to hold the spool on the taper of the spindle. The cover 75 is cut away at 76 the same as cover 6 in order to permit the latch to engage the base of the holder. To permit the thread to freely unwind from the spool the cover is slit the full length of the spool, as shown at 78 in Fig. 11. If desired the base of the holder can be made large enough to hold a plurality of spools, but each one capable of being independently operated as shown in Fig. 12.

Claims.

1. In a device of the character described, a spool holder, a cover for said spool holder, means for locking said holder and cover together, and means for releasing said locking means controlled by the contents of the spool.

2. In a device of the character described, a spool holder, a cover for said spool holder, means capable of automatically latching said holder and cover together, and means capable of unlatching said cover and holder after the contents of the spool have been removed.

3. In a device of the character described, a spool holder, a cover for said spool holder, means for automatically latching said cover to the holder, and means for releasing the latching means from the holder after the contents of the spool have been removed.

4. In a device of the character described, means for holding a spool, means for covering the spool, means for automatically latching said spool holding and covering means together, and means controlled by the contents of the spool for preventing the latching means from being operated.

5. In a device of the character described, means for holding a spool, means for covering a spool, means contained within said cover for automatically latching said spool holder and cover together, and means contained within the holder for releasing the latching means in said cover.

6. In a device of the character described, means for holding a spool, means for covering a spool, means contained within the cover for automatically latching said cover to the holder, and means contained within the holder and operatable from without the holder for releasing the latching means.

7. In a device of the character described, a spool holder, a cover for said spool holder, interiorly arranged means for latching the holder and cover together, and interiorly arranged means controlled by the contents of the spool, and operatable from without the device, for releasing the latching means.

8. In a device of the character described, means for holding the spool, means for covering the spool, means for latching the spool holding and covering means together, means for unlatching the spool holding and spool covering means, and means for preventing the unlatching means from being operated until after the contents of the spool have been removed.

9. In a device of the character described, a spool holder, a cover for said spool holder, a spring latch contained within the cover adapted to secure the holder and cover together, and a plunger operated from without the holder and provided with means within the holder capable of freeing the latch from engagement with the holder when the contents of the spool have been removed.

10. In a device of the character described, a spool holder, a cover for said spool holder, a spring latch contained within the cover adapted to secure the holder and cover together, a plunger operated from without the holder and provided with means within the holder capable of freeing the latch from engagement with the holder, and means controlling the plunger to prevent said plunger from releasing the latch while the spool contains thread.

11. In a device of the character described, a spool holder, a cover for said spool holder, a spring latch for securing said holder and cover together, a plunger operatable from without the holder, means on said plunger within the holder for releasing the latch from engaging position, and means for engaging the contents of the spool to prevent the means on the plunger from releasing the latch.

12. In a device of the character described, a spool holder, a cover for said spool holder, a spring latch for securing said holder and cover together, a plunger operatable from without the holder, means on said plunger within the holder for releasing the latch from engaging position, means for engaging the contents of the spool to prevent the means on the plunger from releasing the latch, and means for holding the said means on the plunger out of engagement with the latch and the contents of the spool.

13. In a device of the character described, a spool holder, a cover for said spool holder, means for latching said spool holder and cover together, means for releasing said latching means after the contents of the spool have been removed, and means capable of releasing the latch before the contents of the spool have been removed.

14. In a device of the character described, a spool holder, a cover for said spool holder, means for latching said spool holder and cover together, means for releasing said latching means after the contents of the spool have been removed, and a key capable of controlling said latch releasing means before the contents of the spool have been removed.

15. In a device of the character described, a spool holder, a cover for said spool holder, an interiorly arranged latch for holding said holder and cover together, a plunger operatable from without the holder capable of releasing the latch after the contents of said spool have been removed, and a key adapted to fit over said plunger and enter the holder to operate the latch releasing means before the contents of the spool have been removed.

16. In a device of the character described, a spool holder, a cover for said spool holder, an interiorly arranged latch for securing the holder and latch together, means for releasing the latch, a plunger operatable from without the holder, means for engaging the contents of the spool to prevent the latch from being released, and a key adapted to control the plunger and remove the means on said plunger from engagement with the contents of the spool so that said latch can be released.

WILLIAM A. COURTLAND.

Witnesses:
M. G. CRAWFORD,
WILLIAM R. RICE.

---

Copies of this patent may be obtained for five cents each, by addressing the "Commissioner of Patents, Washington, D. C."